(12) United States Patent
Acker et al.

(10) Patent No.: US 6,811,168 B2
(45) Date of Patent: Nov. 2, 2004

(54) WHEEL SUSPENSION OF A MOTOR VEHICLE

(75) Inventors: Bernd Acker, Esslingen (DE); Gerhard Meier, Wernau (DE); Friedrich-Wilhelm Schlüter, Leonberg (DE); Arnulf Sponheimer, Stuttgart (DE); Cornelius Statescu, Stuttgart (DE); Thomas Szell, Holzgerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 143 days.

(21) Appl. No.: 10/218,188

(22) Filed: Aug. 13, 2002

(65) Prior Publication Data

US 2003/0047900 A1 Mar. 13, 2003

(30) Foreign Application Priority Data

Aug. 14, 2001 (DE) .......................... 101 39 861

(51) Int. Cl.[7] .............................................. B60G 11/58
(52) U.S. Cl. ................... 280/124.158; 280/124.162; 267/221; 267/34; 267/64.27; 92/92
(58) Field of Search ................... 280/124.158, 124.162, 280/124.157, 124.179, 6.157, 5.514; 267/218, 221, 34, 64.27, 64.28, 64.19, 64.23; 92/92

(56) References Cited

U.S. PATENT DOCUMENTS

| 710,889 | A | * | 10/1902 | Prescott et al. ................ 138/31 |
| 3,645,173 | A | * | 2/1972 | Yarlott ........................... 92/92 |
| 4,564,048 | A | * | 1/1986 | Taylor ........................... 138/31 |
| 4,826,206 | A | * | 5/1989 | Immega ................... 280/5.514 |
| 5,018,436 | A | * | 5/1991 | Evangelista et al. ............ 92/92 |
| 5,201,262 | A | * | 4/1993 | Negishi et al. ................. 92/92 |
| 6,237,904 | B1 | * | 5/2001 | Shepherd ..................... 267/221 |

FOREIGN PATENT DOCUMENTS

| DE | 690 14 488 T2 | 11/1994 |
| DE | 195 47 535 C2 | 6/1997 |
| DE | 201 07 329 U1 | 9/2001 |

* cited by examiner

Primary Examiner—Peter C. English
(74) Attorney, Agent, or Firm—Klaus J. Bach

(57) ABSTRACT

In a suspension of a vehicle wheel on a vehicle body, including a spring element for accommodating the compressive forces acting between the vehicle wheel and vehicle body and with a linear actuator for adjusting the kinematics and the distance between the vehicle wheel and the vehicle body, the spring element and the linear actuator include at least one tubular contraction element with at least one hydraulic or pneumatic or hydropneumatic pressure chamber enclosed in a casing, which is designed in such a way that a pressure rise in the pressure chamber widens the casing radially and shortens it axially.

15 Claims, 10 Drawing Sheets

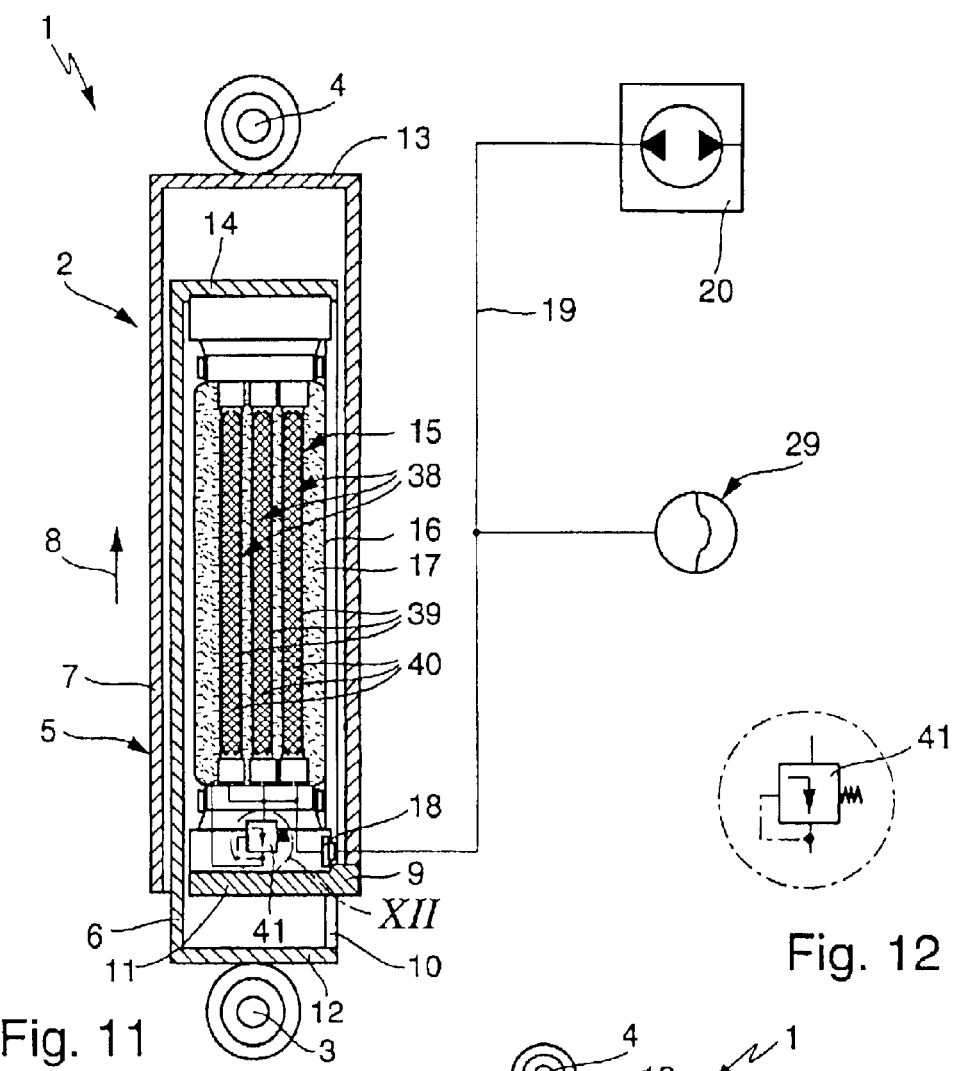
Fig. 11
Fig. 12
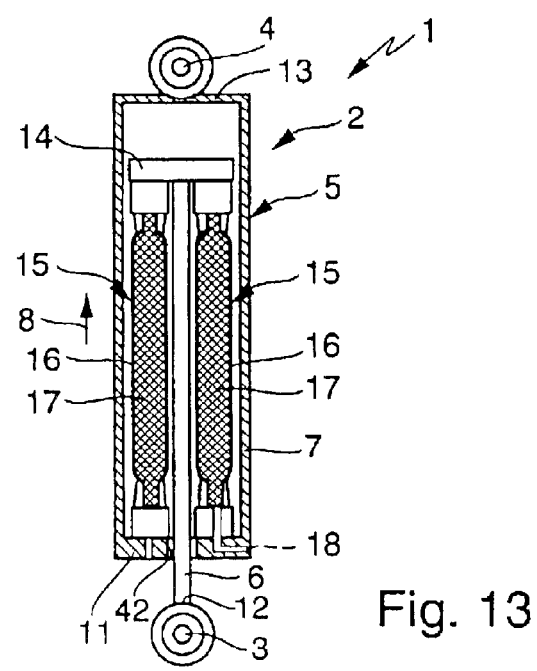
Fig. 13

WHEEL SUSPENSION OF A MOTOR VEHICLE

BACKGROUND OF THE INVENTION

The invention relates to a suspension of a vehicle wheel on a vehicle body, including a spring element accommodating the compressive forces acting between a vehicle and the vehicle body and a linear actuator for adjusting the vehicle height.

A vehicle wheel is coupled to the vehicle body via such a wheel suspension, which provides for damped spring support of the vehicle body on the vehicle wheel. It also determines the kinematics of the vehicle wheel and the axis of rotation of the vehicle wheel. The wheel kinematics or axle kinematics comprise, in particular, the toe-in and the camber of the wheel. Moreover, such a wheel suspension may have integrated into it a level control, with the aid of which the (vertical) distance between the vehicle wheel and the vehicle body can be set.

A suspension of this type generally comprises a spring strut or it is in the form of a spring strut. Such a spring strut contains a spring element. Moreover, a damping element or a damper unit may be integrated into a spring strut. Furthermore, it is possible to integrate a level-control actuator into a spring strut.

Whilst, in a passive suspension, the spring characteristic curve of the wheel suspension is constant, in an active suspension the spring characteristic curve is adapted dynamically to the respective driving situation. With an active suspension, the driving behavior of the vehicle can be influenced positively and vehicle safety increased. Furthermore, it is possible to vary the kinematics, in particular the distance between the vehicle and vehicle suspension, dynamically as a function of the respective driving situation, in order also thereby to improve the drive-dynamic properties of the vehicle. A vehicle chassis which is equipped with an adjustable suspension of this type and/or with such adjustable kinematics is also designated as an "active chassis".

DE 195 47 535 C2 discloses a self-pumping hydropneumatic spring strut with internal level control, which has a working cylinder and a piston pump. The working cylinder carries on a piston rod a piston, which subdivides the working cylinder into two working spaces. The working cylinder is surrounded co-axially by a low-pressure chamber and a high-pressure chamber. Gas and a liquid damping medium are accommodated in the low-pressure chamber, whilst the high-pressure chamber separates the liquid damping medium from the gas volume by means of a diaphragm. A pump rod is held via a holding element between the upper working space of the working cylinder and the high-pressure chamber, the holding element at the same time fixing a valve. The piston rod of the working cylinder is hollow and has a cavity forming a pump cylinder, into which the pump rod extends.

DE 201 07 329 U1 discloses a positioning device operating with a plurality of linear actuators which are formed in each case from a tubular contraction element. A contraction element of this type possesses a fluidic pressure chamber encased by a casing. The casing is designed in such a way that a pressure rise in the pressure chamber widens the casing radially and shortens it axially. The casing consists, for example, of a leak-tight flexible tube, around which high-tensile fibers are spun in a diamond-shaped manner. The three-dimensional lattice structure formed in this way is deformed in a circumferential direction when the pressure rises in the pressure chamber. At the same time, a desired tensile force occurs in the axial direction.

DE 690 14 488 T2 discloses a further wheel suspension having a spring element, a damping element and an electromechanical linear actuator, which is expediently designed as an electric linear motor.

It is the object of the present invention to provide a particularly advantageous embodiment for a wheel suspension of the type mentioned in the introduction.

SUMMARY OF THE INVENTION

In a suspension of a vehicle wheel on a vehicle body, including a spring element for accommodating the compressive forces acting between the vehicle wheel and the vehicle body and with a linear actuator for adjusting the kinematics and the distance between the vehicle wheel and vehicle body, the spring element and the linear actuator include at least one tubular contraction element with at least one hydraulic or pneumatic or hydropneumatic pressure chamber enclosed in a casing, which is designed in such a way that a pressure rise in the pressure chamber widens the casing radially and shortens it axially.

The invention is based on the general idea of forming a spring element and/or a linear actuator of the wheel suspension by means of a tubular contraction element of the above-mentioned type. A particular advantage of this form of use is seen in the low weight of the tubular contraction element, with the result that considerable weight saving can be achieved on the vehicle. Furthermore, relatively high dynamics, along with comparatively high actuating forces, can be achieved by means of relatively low pressures and low volume flows. In particular, it is thereby possible to implement active springing by means of a gaseous medium.

According to a particular advantageous embodiment of the invention, a force deflection device is provided, which converts the compressive forces occurring between the vehicle wheel and vehicle body into tensile forces. The contraction element is supported on the vehicle wheel and on the vehicle body via the force deflection device. With the aid of a force deflection device of this type, it is possible to use a linear actuator, which per se can generate only tensile forces, or a spring element, which per se possesses the desired springing property in the tension direction only, in a wheel suspension in which the vehicle wheel is supported on the vehicle body by a spring structure which is subjected to compressive forces.

With the aid of this force deflection device, therefore, it is possible to use the contraction element as a tension-spring element or as a tensile linear actuator in the wheel suspension.

A force deflection device of this type may have a lever arrangement which is supported, on the one hand, on the vehicle wheel and, on the other hand, on the vehicle body, the contraction element being connected, at one end, to the vehicle body and, at the other end, to the lever arrangement, in particular via a rocker lever supported on the vehicle body. By means of this lever arrangement, the available tensile forces can be deflected relatively simply to accommodate the compressive forces, and, moreover, it is possible for the contraction element used in each case to provide on the vehicle body a suitable arrangement which depends, for example, on the available installation space. For example, the contraction element may be arranged vertically or horizontally, in the vehicle longitudinal direction or transversely to the latter.

In a particular embodiment, the force deflection device may have two support elements designed to be displaceable one in the other in the spring-compression direction of the vehicle wheel with respect to the vehicle body. One support element is secured with its fixed end to the vehicle wheel, whilst the other suppor element is secured with its fixed end to the vehicle body. The contraction element is arranged coaxially to the support elements and is connected, at one end, to the free end of one support element and, at the other end, to the free end of the other support element. With the aid of the force deflection device provided in this way, the same installation position which, for example, a conventional helical compression spring has in a conventional spring strut is achieved with the contraction element which per se can absorb or generate only tensile forces. By means of the support elements, direct force transmission takes place between the vehicle wheel and vehicle body, on the one hand, and the contraction element, on the other hand. However, the effective direction of the forces is reversed. By virtue of this arrangement, the performance capability of the contraction element can be utilized optimally.

The contraction element supported axially between the free ends of the support elements may be used, for example, as a spring element. In a particularly simple embodiment, the pressure chamber of the contraction element may be filled with a gaseous fluid. In this case, spring characteristic curves similar to those of a helical steel compression spring can be generated. By the pressure chamber being connected to a pressure control device, the characteristic curve of the spring suspension thus formed can be varied, in particular adapted dynamically. Furthermore, a level control is provided as a result. If a hydraulic fluid is used, a spring accumulator for volume compensation is necessary in the hydraulic circuit.

In one embodiment, one of the two support elements may have a helical compression spring, via which the ends of this support element are supported on one another. In this embodiment, functional separation may be carried out in such a way that the contraction element is operated solely as a linear actuator, whilst the helical compression spring provides essentially only the spring action. Combinations are also possible in which both, the helical compression spring and the contraction element, exert a spring action.

According to a particular embodiment, the contraction element may be of annular design and have an outer casing and an inner casing arranged concentrically to the latter, the outer casing encasing the pressure chamber radially on the outside and the inner casing encasing the pressure chamber radially on the inside. The two casings are designed in such a way that a pressure rise in the pressure chamber shortens both casings axially and widens the outer casing radially outwards and the inner casing radially inwards. In this embodiment, the pressure chamber is thus designed as a toroidal annular chamber. Relatively high tensile forces, along with relatively small volume changes in the pressure chamber, can thereby be implemented.

In one embodiment, this annular contraction element may contain centrally an axial passage which is surrounded by the inner casing. In this embodiment, a damper unit may extend co-axially through this passage and be connected, at one end, to the vehicle wheel, and at the other end, to the vehicle body. A particularly compact design is thus obtained.

In another embodiment, the central axial passage enclosed by the inner casing is in communication with the pressure chamber of the contraction element. In particular, a flow-damping member may then be arranged between the pressure chamber of the annular contraction element and the inner passage. Furthermore, it is possible to connect the pressure chamber of the annular contraction element indirectly via the inner passage to a pressure source or to a pressure generator. These measures simplify the set-up of the arrangement as a whole. In this embodiment, a gas volume may be arranged in the passage or in the pressure chamber of the contraction element, said gas volume permitting volume compensation.

In a particular embodiment, a further contraction element may be arranged co-axially in the passage. Then the pressure chamber of the inner contraction element is filled with a gas, whilst the passage and the pressure chamber of the outer contraction element are filled with a hydraulic fluid. In this design, the inner contraction element forms a gas accumulator which is sealed off hermetically with respect to the hydraulic medium surrounding it.

In another embodiment, at least one inner contraction element may be arranged in the pressure chamber of an outer contraction element, the pressure chamber of the inner contraction element being filled with a hydraulic fluid, whilst the pressure chamber of the outer contraction element is filled with gas or with gas and hydraulic fluid. In this embodiment, the at least one inner contraction element serves solely as a tensile linear actuator, while the outer contraction element serves for volume compensation, as passive spring suspension and, in particular, also can be used for level control. In this embodiment, the volume flows necessary for achieving an axial adjusting movement of the inner contraction element are relatively low, so that the linear actuator thus produced can be operated with high dynamics.

As far as the contraction element used as tension-spring element is operated with a hydraulic medium, a spring accumulator must be in communication with the pressure chamber for volume compensation. A spring accumulator of this type, in ah advantageous embodiment, contains at least one contraction element of the above-described type, the pressure chamber of this contraction element being filled with a hydraulic fluid and being connectable via a corresponding connection to a hydraulic circuit, in which the spring accumulator ensures the necessary volume compensation. The contraction element engages, at one end, a base and, at the other end, a spring plate. Arranged co-axially to the contraction element is a helical compression spring, which is supported, at one end, on the base and, at the other end, on the spring plate. With the aid of this helical compression spring, a spring force counteracting the contraction of the contraction element can be introduced to the contraction element. A pressure increase in the pressure chamber leads to a shortening in length of the casing. This movement is counteracted by the helical compression spring, with the result that the desired spring action of the spring accumulator is established.

Important features and advantages of the invention will become apparent from the following description of the invention with reference to the accompanying drawings.

Exemplary embodiments of the invention are illustrated in the drawings and explained in greater detail in the following description.

BRIEF DESCRIPTION OF THE DRAWINGS

FIG. 11 shows in a longitudinal view an additional embodiment similar to that shown in FIG. 1, FIG. 12 shows in an enlarged illustration a detail XII from FIG. 11, FIG. 13 shows in a longitudinal sectional view a further embodiment of the spring strut.

DESCRIPTION OF PREFERRED EMBODIMENTS

In the figures, the same reference symbols relate to identical or functionally identical or similar features.

Figure 1:
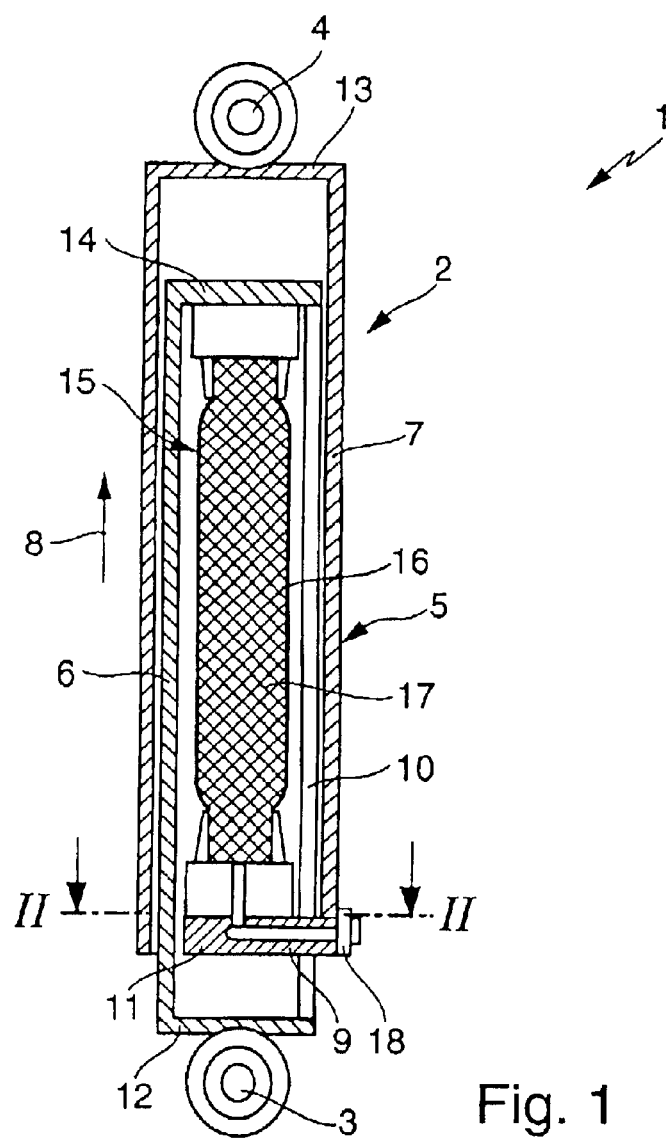
FIG. 1 shows, in a longitudinal cross-sectional view, a first embodiment of a spring strut according to the invention.

According to FIG. 1, a wheel suspension 1 may have a spring strut 2 which is supported by means of a lower bearing 3 on a vehicle wheel, not shown, and by means of an upper bearing 4 on a vehicle body, not shown. The spring strut 2 serves for the resilient and, if appropriate, damping support of the vehicle body on the vehicle wheel. A reversed installation position is likewise possible.

Figure 2:
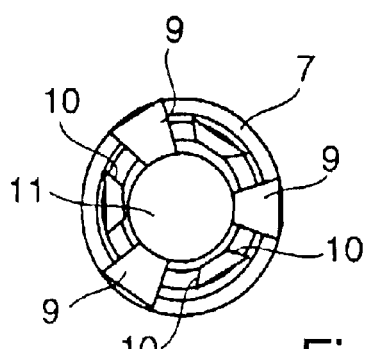
FIG. 2 is a cross sectional view of the spring strut according to FIG. 1 taken along line II—II of FIG. 1.

In the spring strut 2 shown, the two bearings 3 and 4 are coupled to one another via a force reversing device 5 which has two support elements, that is, a first support element 6 and a second support element 7. The two support elements 6, 7 are displaceable one in the other in a spring-compression direction 8, as indicated by an arrow, in which the vehicle wheel is spring-compressed with respect to the vehicle body. In the present case, the two support elements 6 and 7 form cages axially displaceable one within the other, that is, an inner cage formed by the first support element 6 and an outer cage formed by the second support element 7. According to FIG. 2, the two cages (support elements 6 and 7) pass one through the other in the radial direction, in that transverse webs 9 of the outer cage or of the outer support element 7 project through axial openings 10 in the inner cage or in the inner support element 6 into the interior of the inner support element 6 for radially positioning a free end 11 of the outer support element 7.

The lower bearing 3 is formed at a fixed end 12 of the first support element 6, with the result that the first support element 6 is secured to the vehicle wheel. In contrast to this, the upper bearing 4 is formed at a fixed end 13 of the second support element 7, with the result that the latter is secured to the vehicle body. The first support element 6 projects with a free end 14 into the second support element 7.

According to the invention, the wheel suspension 1 or, here, the spring strut 2 includes a tubular contraction element 15 which is connected at one end, here at the top, to the free end 14 of the first support element 6 and at the other end, here at the bottom, to the free end 11 of the second support element 7. This contraction element 15 includes a casing 16 which is formed, for example, by a leak-tight flexible tube which is provided on the inside and/or on the outside with a specially woven fabric layer. The casing 16 forms a pressure chamber 17. The casing 16 or its fabric layer is designed or woven in such a way that a pressure rise in this pressure chamber 17 widens the casing 16 radially and at the same time shortens the latter axially. This means that, with an increase of the pressure in the pressure chamber 17, the axial length of the contraction element 15 is shortened. Vice versa, a tensile force acting on the ends of the contraction element 15 leads to a pressure rise in the pressure chamber 17.

The force reversal device 5 has the effect that compressive forces which act between the vehicle wheel and the vehicle body and are introduced into the support elements 6 and 7 via the bearings 3 and 4 seek to move the free ends 11 and 14 of the support elements 6 and 7 away from one another. As a result, the contraction element 15 connected to these free ends 11 and 14 is subjected to tensile forces.

The pressure chamber 17 can be filled via a fluid connection 18 with a fluid, that is to say with a gas and/or with a hydraulic fluid, so that a desired pressure can be established in the pressure chamber 17. Compression of the spring strut causes an elongation of the contraction element 15. By virtue of the special configuration of the casing 16, as a result of this axial stretching of the casing 16 the diameter of the latter is reduced and the total volume of the pressure chamber 17 is decreased, with the result that the pressure in the pressure chamber 17 rises. The contraction element 15 correspondingly counteracts the spring-compression movement, that is, the contraction element 15 acts in the same way as a tension-spring element. It has been shown that, during spring compression, the contraction element 15 exhibits a similar characteristic to a coil spring made of steel. During the expansion of the spring strut 2, the contraction element 15 can axially contract, and the pressure in the pressure chamber 17 is decreasing.

If the pressure chamber 17 is filled with a hydraulic fluid, the pressure chamber 17 must be coupled to a spring accumulator which provides for a hydraulic system that, on the one hand, makes volume compensation possible and, on the other hand, assumes the spring function. The contraction element 15 then serves as a converter which converts a relative adjustment between the two support elements 6 and 7 into a pressure change in the hydraulic system, this pressure change being cushioned by a spring accumulator connected to the hydraulic system.

Figure 3:
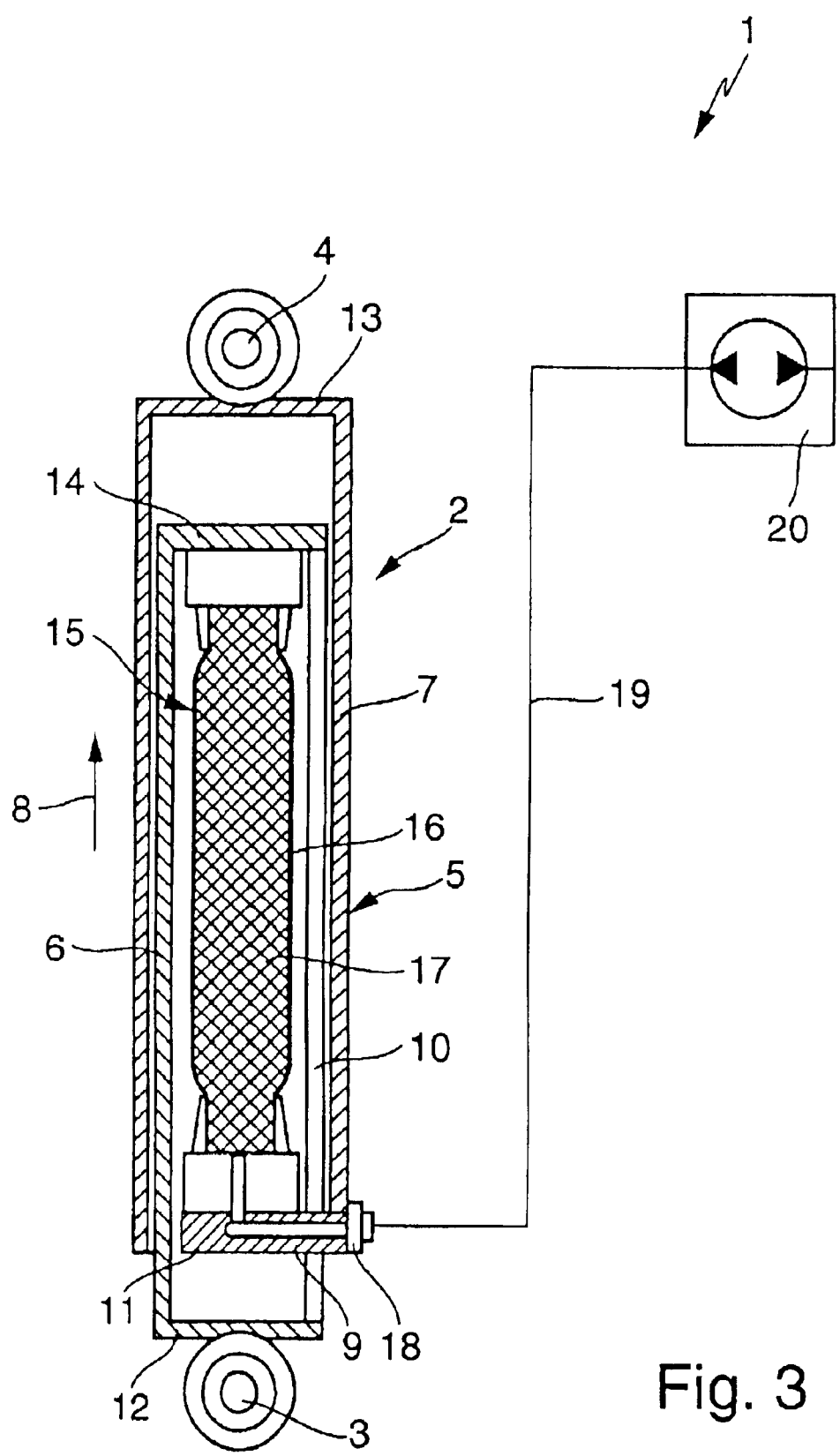
FIG. 3 shows in a longitudinal cross-sectional view a second embodiment.

In the embodiment according to FIG. 3, the fluid connection 18 is connected via a fluid line 19 to a hydraulic or pneumatic pressure generator or pressure accumulator 20 which may be formed, for example, by a hydraulic-medium pump or by a gas compressor. It is likewise possible to provide a motor/pump unit or an electromagnetic linear or rotary actuator.

Whilst the spring strut 2 of the embodiment according to FIG. 1 provides passive spring support, in the embodiment shown in FIG. 3 active spring support may be provided for, in that the pressure in the pressure chamber 17 is variable as a function of the current driving situation of the vehicle by a corresponding operation of the pressure generator 20. For example, roll stabilization and/or pitch stabilization of the vehicle may be carried out. In this embodiment, the contraction element 15 acts in the same way as a linear actuator.

Furthermore, in the embodiment shown in FIG. 3, it is possible, by an appropriate operation of the pressure generator 20, to vary the length of the contraction element 15, for example in order thereby to provide for level control. The advantageous properties of the contraction element 15 in this case make it possible to carry out actuating movements even in the case of relatively low volume flows or pressure changes. In particular, it is thereby possible to carry out active spring support pneumatically. If a hydraulic fluid is used, a spring accumulator must again be connected to the hydraulic system.

Figure 4:
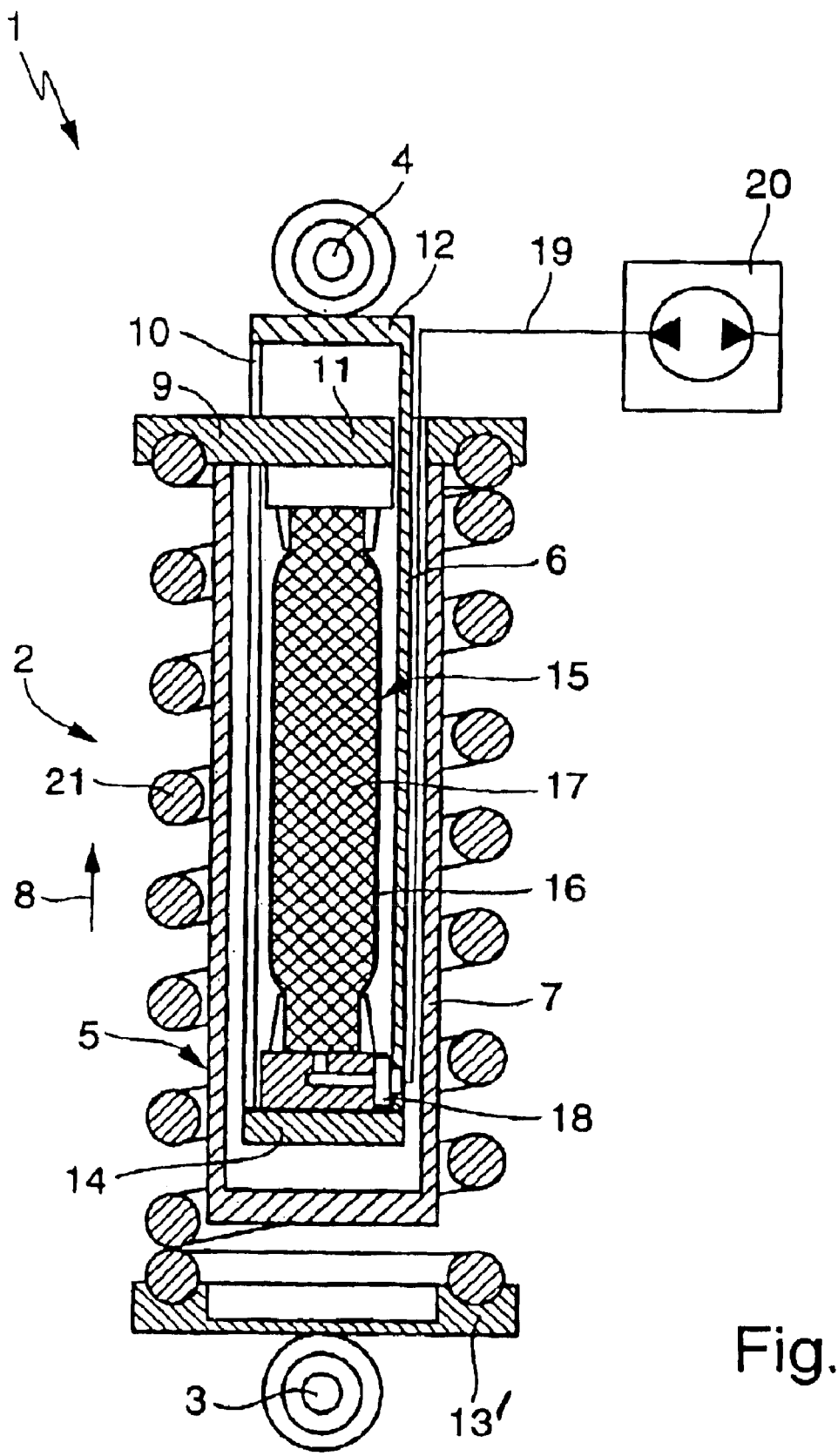
FIG. 4 shows in a longitudinal sectional view of a third embodiment.

In the embodiment according to FIG. 4, in contrast to the above-mentioned embodiments, the first, inner support element 6 is connected to the upper bearing 4, whilst the second, outer support element 7 is connected to the lower bearing 3. In this particular embodiment, the outer support element 7 is surrounded by a coil compression spring 21 which is supported between the fixed end 13' secured to the lower bearing 3 and the free end 11 of the second support element 7. This coil compression spring 21 in this case serves as a conventional spring element for achieving the springing action of the spring strut 2. If the contraction element 15 is operated with essentially incompressible fluid, the spring function of this spring strut 2 is provided essentially solely by the helical compression spring 21. However, if the contraction element 15 is operated with a compressible fluid, the latter also acts as a spring element, so that the overall spring action is obtained as a result of the series connection, shown, of the two spring elements, to be precise the contraction element 15 and the helical compression spring 21.

In principle, however, in the embodiment shown here, functional separation may be achieved between the spring action of the helical compression spring 21 and an adjusting function by the contraction element 15 acting as a linear actuator.

Figure 5:
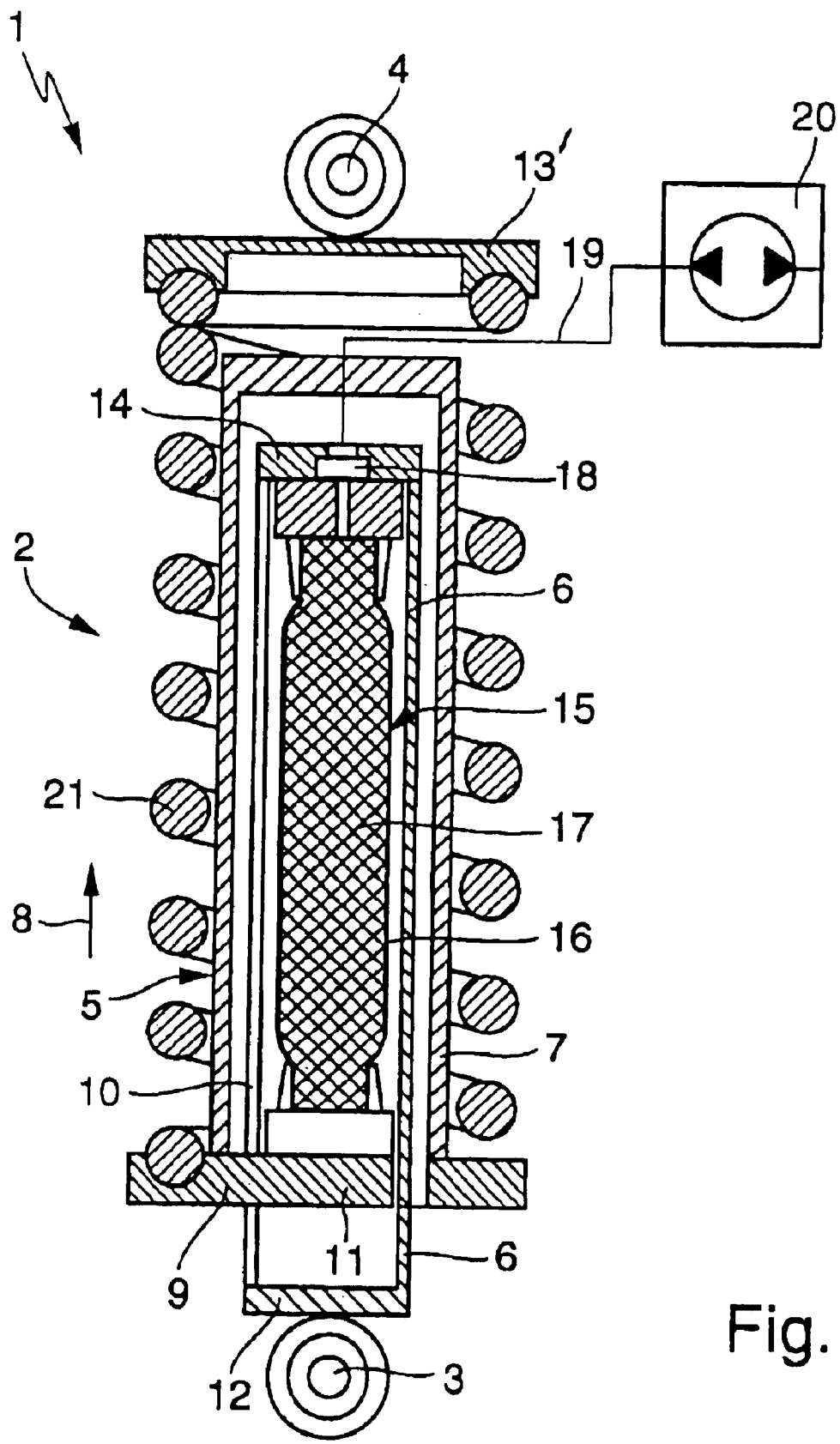
FIG. 5 shows in a longitudinal cross-sectional view, an alternative embodiment of that shown in FIG. 4.

In the embodiment according to FIG. 5, in contrast to the exemplary embodiment of FIG. 4, the inner, first support element 6 is secured to the lower bearing 3, whilst the outer, second carrying element 7 is secured to the upper bearing 4. Furthermore, in this exemplary embodiment, it is illustrated that the fluid connection 18 may also be mounted at a point other than that shown in the preceding examples.

Figure 6:
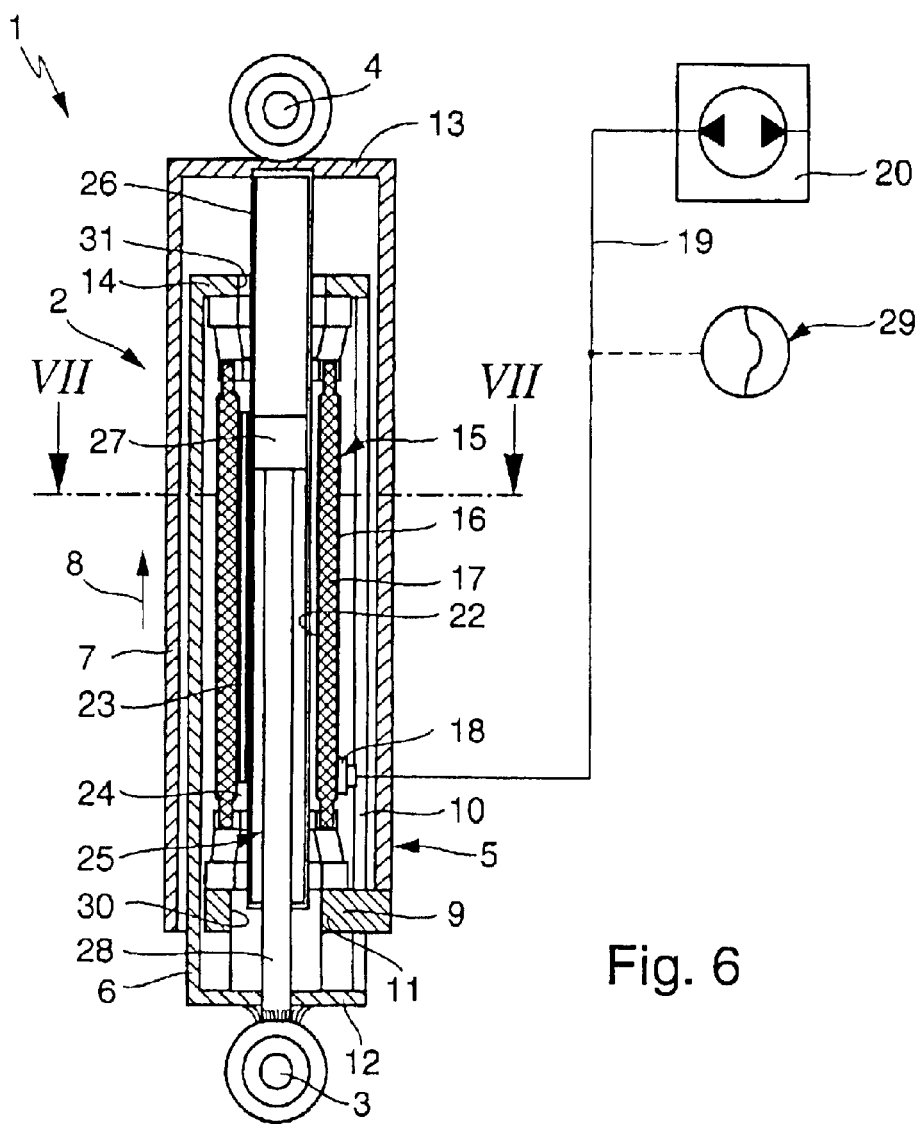
FIG. 6 shows another embodiment of a spring strut as shown in FIG. 1.

According to a particular embodiment as shown in FIG. 6, the contraction element 15 may be of annular design, the casing 16 forming an outer casing located radially on the outside. In addition to this outer casing 16, an inner casing 22 arranged concentrically to the outer casing 16 is provided, the two casings 16 and 22 encasing the now annularly designed pressure chamber 17 radially on the outside and radially on the inside. The pressure chamber 17 is consequently of toroidal design. What may also be achieved here by a special design of the outer casing 16 and of the inner casing 22 is that a pressure rise in the pressure chamber 17 is accompanied by an axial shortening of the two casings 16 and 22, during which the outer casing 16 is widened radially outwards and the inner casing 22 moves radially inwards.

Figure 7:
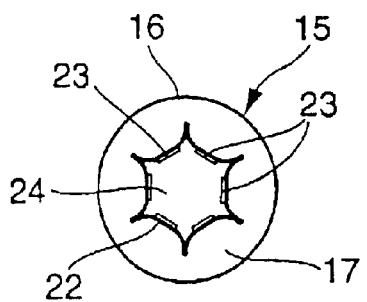
FIG. 7 is a cross sectional view taken along line VII—VII of FIG. 6.

FIG. 7 illustrates a cross-section of the contraction element 15 formed in this way. So that a defined deformation of the inner casing 22 can be ensured, reinforcing elements 23 may be attached on the radially inner side.

In the embodiment reproduced in FIG. 6, the outer casing 16 and inner casing 22 of the contraction element 15 are dimensioned such that an axial passage 24 surrounded by the inner casing 22 is formed concentrically inside the contraction element 15. According to FIG. 6, a damper unit 25 of the spring strut 2 may be disposed in this passage 24. This damper unit 25 includes a cylinder 26, in which a piston 27 is axially adjustably mounted. This piston 27 is mounted on a piston rod 28 which is secured here to the lower bearing 3, whilst the cylinder 26 is secured to the upper bearing 4. Correspondingly, the piston rod 28 is connected firmly to the inner, first support element 6, and the outer, second support element 7 is connected firmly to the cylinder 26. This damper unit 25 operates in a conventional way and can damp the relative movements between the two bearings 3 and 4 and therefore the relative movements between the vehicle wheel and the vehicle body. By this damper unit 25 being integrated into the spring strut 2, a particularly compact set-up is obtained in that the damper unit 25 can extend through the spring strut 2 essentially in a straight line. The free ends 11 and 14 of the support elements 6 and 7 are provided with corresponding central openings 30 and 31.

Insofar as the contraction element 15 is operated hydraulically, the hydraulic system must have a spring accumulator 29. In the present case, such a spring accumulator is connected to the fluid line 19, with the result that the spring accumulator 29 communicates with the pressure chamber 17 of the contraction element 15.

Figure 8:
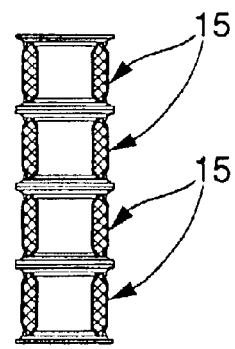
FIG. 8 shows a longitudinal section through a special embodiment with contraction elements arranged in series.

As should be apparent from FIG. 8, a plurality of contraction elements 15 may be connected to one another in a series arrangement, in order to achieve a desired characteristic curve or characteristic for the contraction arrangement thus formed. It is likewise possible additionally or alternatively to arrange a plurality of contraction elements 15 in parallel.

Figure 9:
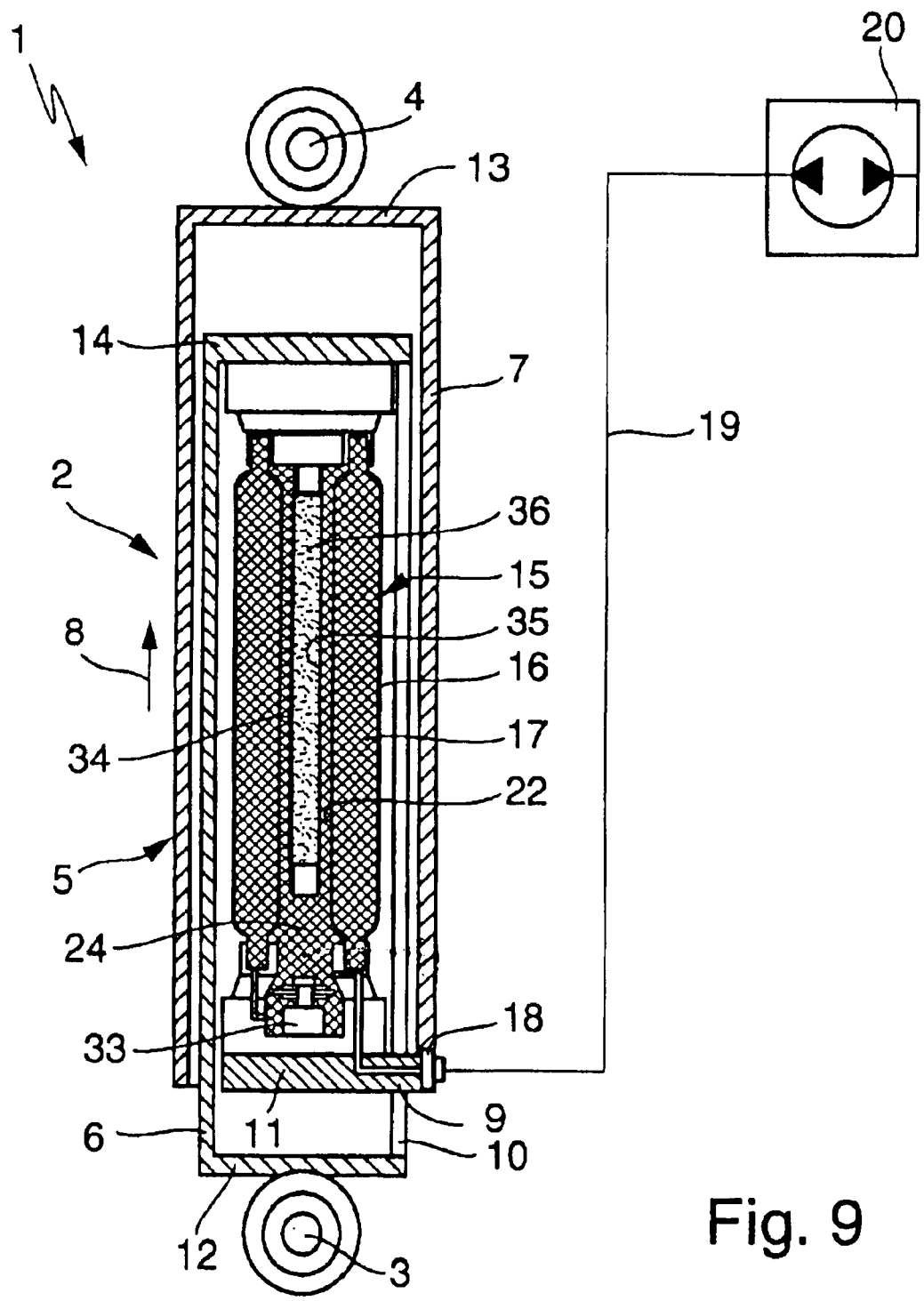
FIG. 9 shows in a longitudinal sectional view further embodiment of the spring strut shown in FIG. 1.

According to FIG. 9, in another embodiment, the passage 24 arranged radially on the inside in the contraction element 15 and enclosed on the outside by the inner casing 22 forms a fluidically leak-tight design and is in communication with the pressure chamber 17 of the contraction element 15 via an inner connecting duct which is not shown. A flow-damping member 33 throttles the fluid exchange between the passage 24 and the pressure chamber 17. In the special embodiment shown here, the passage 24 has arranged in it a further contraction element 34 which is sealed fluidically and which extends coaxially in the passage 24. This inner contraction element 34 too, includes a casing 35 which encases a pressure chamber 36. In the embodiment according to FIG. 9, the pressure chamber 36 of the inner contraction element 34 is filled with gas and thus serves as a spring accumulator. In contrast to this, the entire volume of the remaining passage 24 and of the pressure chamber 17 of the outer annular contraction element 15 is filled with a hydraulic medium. The spring property of this arrangement of contraction elements 15 and 34 is made possible by the inner contraction element 34 which serves as a spring accumulator. The actuator function of the arrangement (15, 34) is provided essentially by the annular outer contraction element 15. The pressure chamber 17 of the outer contraction element 15 is acted upon by pressure in this case indirectly via the passage 24 and therefore via the flow-damping member 33. By virtue of this measure, the effective damping force can be utilized in order to generate dynamic actuating forces; the actuating dynamics of this arrangement (15, 34) are thereby improved.

Figure 10:
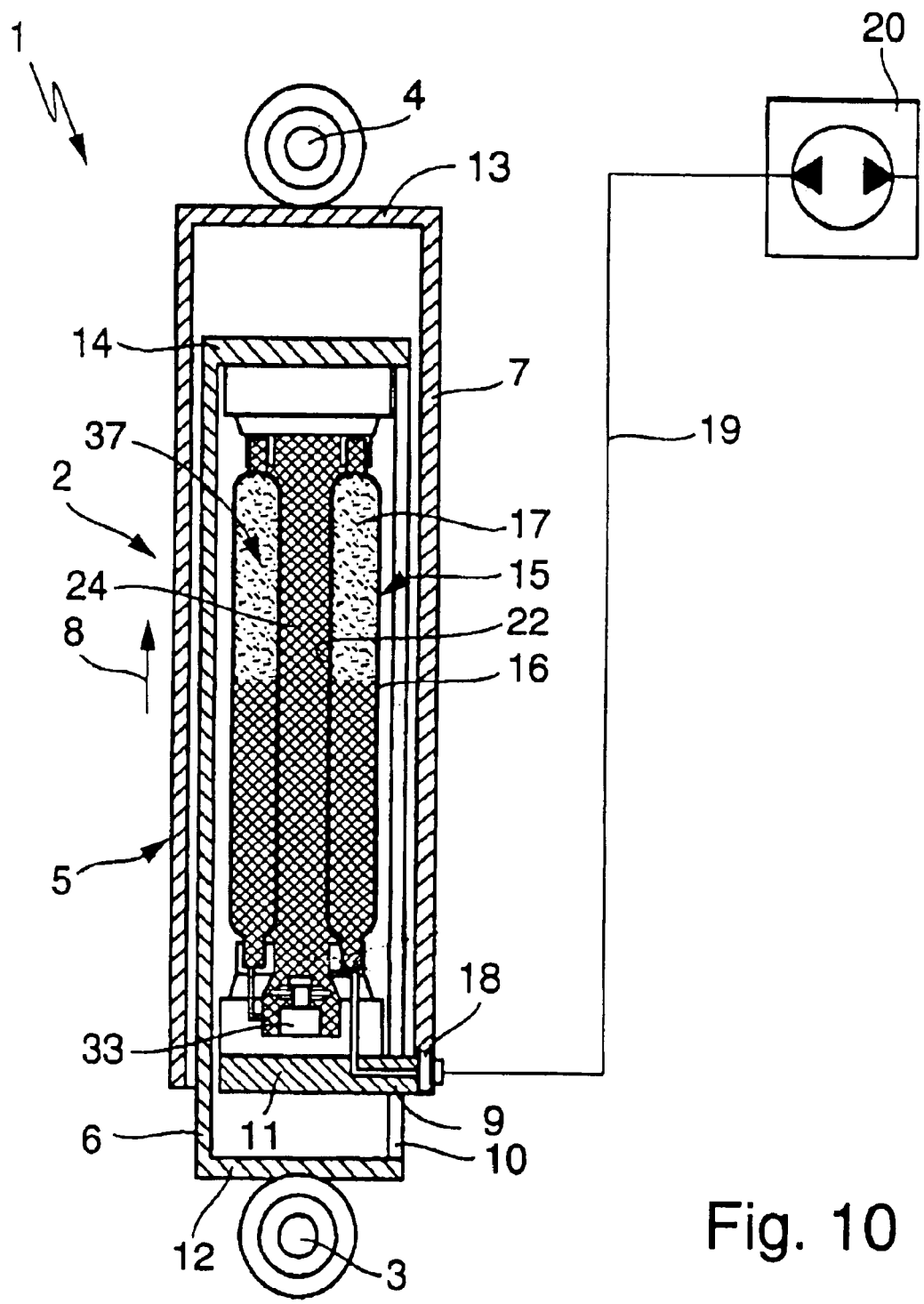
FIG. 10 shows still another embodiment of a spring strut.

In the embodiment according to FIG. 10, a gas volume 37 is embedded into the communicating system consisting of the pressure chamber 17 of the contraction element 15 and of the passage 24. In the embodiment shown here this gas volume 37 is located in the pressure chamber 17 of the contraction element 15. In another embodiment, this gas volume 37 may also be accommodated in the passage 24. The remaining volume of the pressure chamber 17 and passage 24 is filled with a hydraulic medium. In the embodiment with a gas volume 37 located on the outside, there may be advantages as the thermal load is lower during Th the operation of the spring strut 2. In order to avoid foaming of the hydraulic medium, the gas volume 37 may by encapsulated so that the gas is not in contact with the hydraulic medium.

In the embodiment according to FIG. 11, at least one further contraction element 38 is arranged inside the contraction element 15, that is to say in the pressure chamber 17 of the latter. In the present case, three further inner contraction elements 38 are arranged in the pressure chamber 17 of the outer contraction element 15. Each of these inner contraction elements 38 includes, in the way already outlined, a casing 39 which in each case encloses a pressure chamber 40 of the respective contraction element 38. The inner contraction elements 38 are in each case filled with a hydraulic fluid and serve as parallel-connected linear actuators, with the aid of which active springing can be provided. In contrast, the outer contraction element 15 serves essentially as a spring element, the pressure chamber 17 of the outer contraction element 15 being filled with gas or with gas and a hydraulic fluid. The outer contraction element 15 may be used for applying a static basic load, in order, for example, to provide level control. It is clear that the springing property of this entire arrangement also depends on the spring action of the inner contraction elements 38, which is made possible by the spring accumulator 29.

It is particularly advantageous, in this arrangement, that, depending on the pre-contraction of the outer contraction element 15, the inner contraction element 38 can be operated from a zero-percent contraction. The actuating movement then commences with maximum force and at the same time requires a relatively low volume flow. With increasing actuating travel, the actuating force decreases, in particular, linearly to zero, whereas the required volume flow increases in square.

In the particular embodiment shown here, the pressure chambers 40 of the inner contraction elements 38 are coupled via a differential-pressure valve 41 to the pressure chamber 17 of the outer contraction element 15. This differential-pressure valve 41 makes it possible to set the pressure in the pressure chamber 17 of the outer contraction element 15 to a constant preset value, for example 10 bar. The pressure chambers 40 of the inner contraction elements 38 can thus be operated with higher pressures, for example 10 to 20 bar.

If, with the same initial pressure, for example 10 bar, the pressure in the pressure chamber 17 of the outer contraction element 15 is lowered, a contraction movement of the inner contraction element 38 commences as a result of an increased force action in the event of an increasing relative pressure in the pressure chambers 40 of the inner contraction elements 38. The volume flows necessary for a contraction movement are very low in this embodiment.

In the embodiment according to FIG. 13, the first support element 6' is designed in the form of a rod which at its fixed end 12 carries the lower bearing 3 and at its free end 14 is designed in a manner of a piston. The second support element 7 is designed, in this embodiment, as a cylindrical tube, into which the rod-shaped support element 6' extends. For this purpose, the rod-shaped support element 6' extends through an opening 42 of the free end 11 of the tubular support element 7. In this special embodiment, a plurality of contraction elements 15 are provided, which are accommodated within the tubular support element 7 co-axially with the rod-shaped support element 6'. These contraction elements 15 thus act in parallel.

Figure 14:
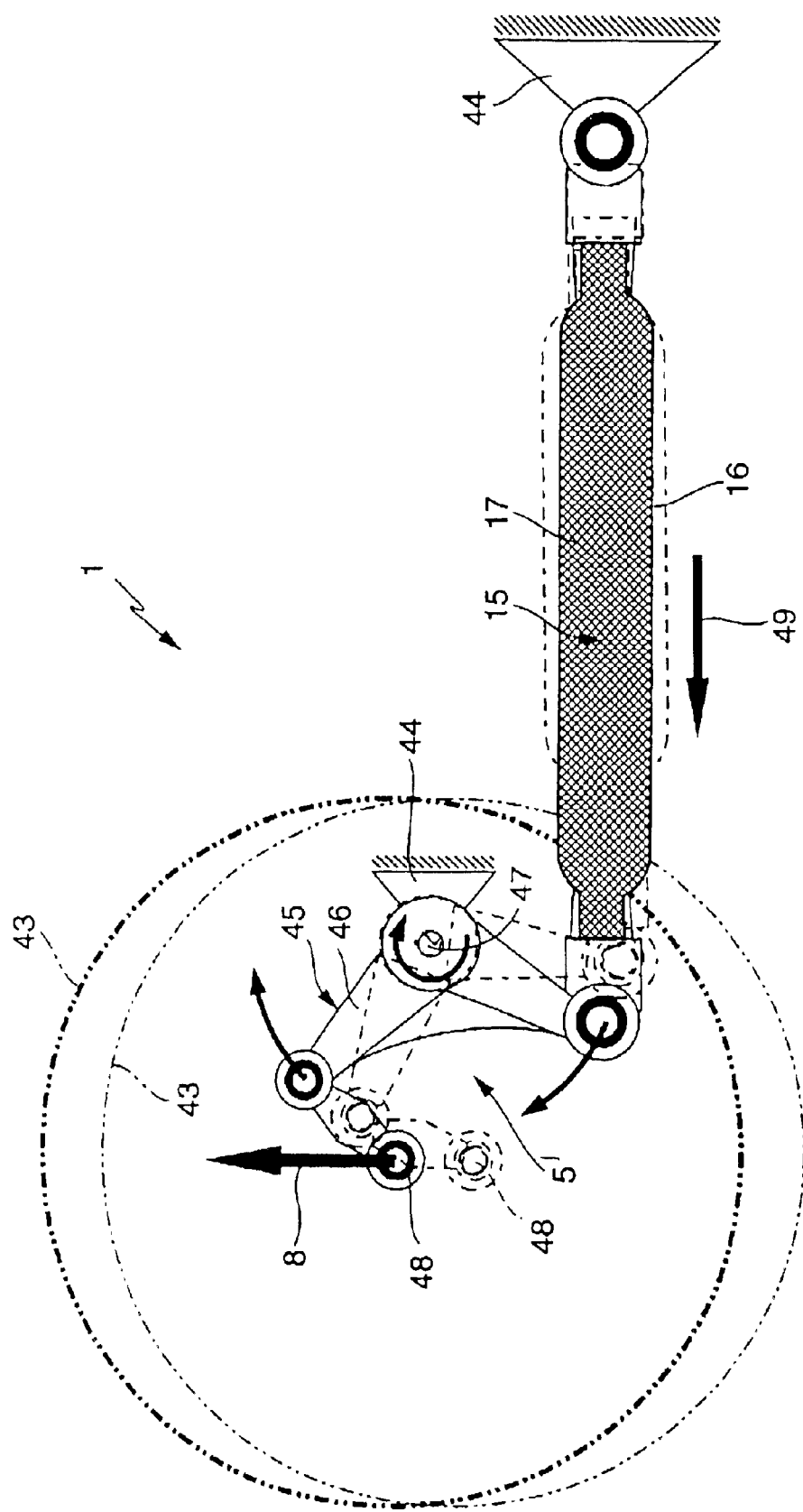
FIG. 14 is a side view of a greatly simplified basic illustration of a wheel suspension according to the invention.

Whilst, in the exemplary embodiments described above, the contraction elements 15 are in each case accommodated in a spring strut 2 arranged more or less conventionally in the suspension 1, FIG. 14 shows a special embodiment of the wheel suspension 1 according to the invention, in which the contraction element 15 is arranged unconventionally. According to FIG. 14, a vehicle wheel 43 is again supported via a force deflection structure 5' on a vehicle body 44, illustrated merely, symbolically. The force deflection structure 5' is formed, here, by a lever arrangement 45 which has a rocker lever 46. In this case, a rocker bearing 47 of the rocker lever 46 is supported by the vehicle body 44. The contraction element 15 is connected to the lever arrangement 45 via this rocker lever 46, the contraction element 15 likewise being connected, with its other end, to the vehicle body 44. This rocker lever 46 is in this case connected, at one end, to the contraction element 15 and, at the other end, via the other components of the lever arrangement 45, to the vehicle wheel 43.

By means of the lever arrangement 45, compressive forces which act between the vehicle wheel 43 and the vehicle body 44 are converted to tensile forces on the contraction element 15. FIG. 14 illustrates an example of movement which corresponds to a spring-compression movement of the vehicle wheel 43 according to the arrow 8. A wheel axle 48 is in this case raised in the direction of the arrow. The rocker lever 46 is then rotated clockwise via the lever arrangement 45, with the result that a tensile force acts on the contraction element 15 according to the arrow 49. In principle, here too, this contraction element 15 may be configured in the manner of a passive spring or in the manner of an active spring, combinations of the features described above being possible.

According to FIG. 14, therefore, the contraction element 15, which can be operated as a spring element and/or as a linear actuator, can be arranged, oriented horizontally, on the vehicle, and the contraction element 15 can extend, for example, in the vehicle longitudinal direction. An arrangement transverse to the vehicle longitudinal direction is also possible. It is clear that any other desired inclination can be implemented.

Figure 15:
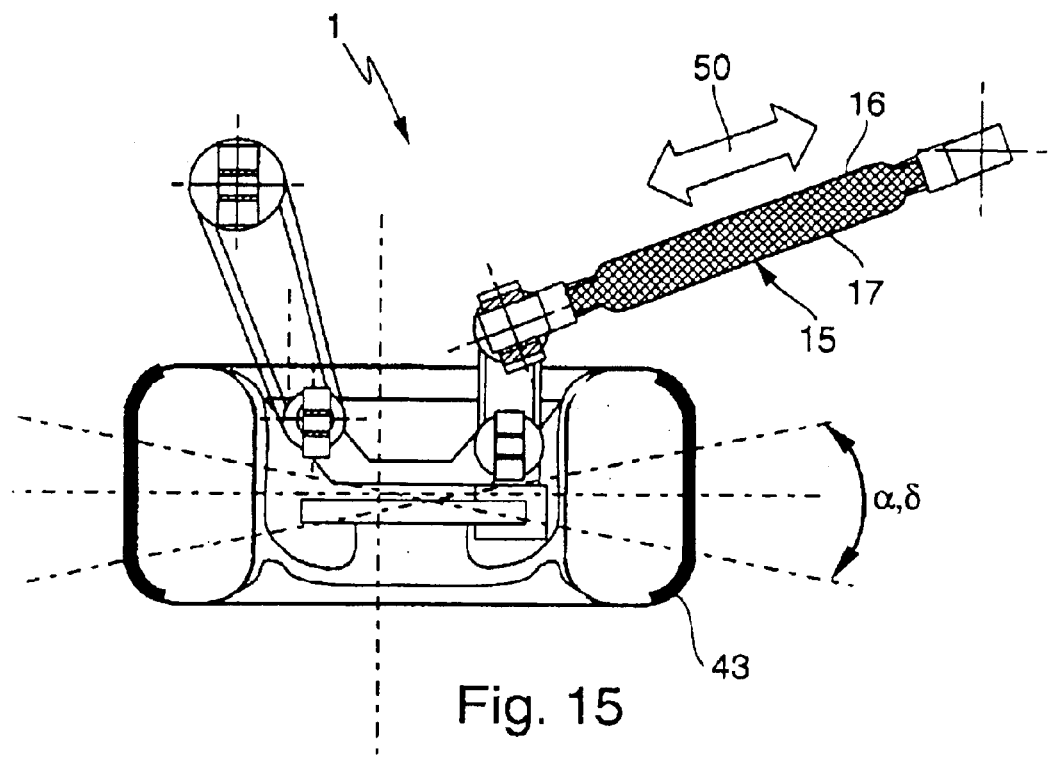
FIG. 15 shows, in a greatly simplified top view, a wheel suspension using struts according to the invention.

In the embodiment according to FIG. 15, the contraction element 15 is integrated into the wheel suspension 1 in such a way that the contraction element 15 forms a link of adjustable length, in particular a longitudinal link, of this wheel suspension 1. With the aid of such a longitudinal link of adjustable length, for example, a toe-in angle α and/or a slip angle δ of the vehicle wheel 43 can be set in a desired way. The contraction element 15 in this case acts as a straightforward linear actuator which is operated preferably hydraulically. The toe-in angle α or the slip angle δ can be set relatively accurately via the hydraulic pressure in the pressure chamber 17 of the contraction element 15. Thus, with the aid of the contraction element 15, the kinematics of the vehicle wheel 43 can be controlled in a specific way, so that an active chassis can be implemented by means of the wheel suspension 1 shown. The set-up of the wheel suspension 1 should in this case be selected in such a way that the contraction element 15 used as a longitudinal link is subjected only to stress in the tension direction according to a double arrow 50.

Figure 16:
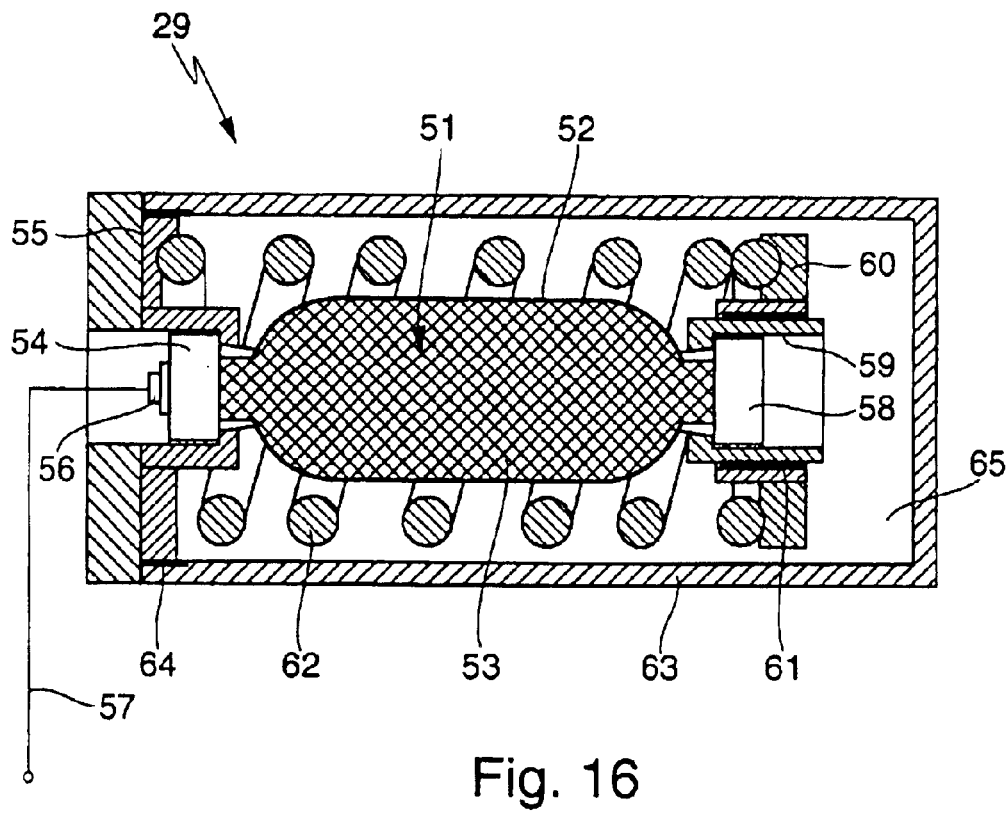
FIG. 16 is a longitudinal sectional view of a spring accumulator according to the invention.

According to FIG. 16, a special embodiment of a spring accumulator 29, as it is used, for example, in FIGS. 6 and 11, may likewise contain a contraction element 51 of the above-described type, including a casing 52 which encloses a pressure chamber 53. The contraction element 51 is in this case anchored, at one end 54, illustrated on the left in FIG. 16, in a base 55. The pressure chamber 53 of this contraction element 51 can be connected via a hydraulic connection 56 to a hydraulic system 57, the hydraulic volume of which is to be capable of carrying out spring volume changes with the aid of the spring accumulator 29. For example, this hydraulic system 57 may comprise the pressure chamber 17 of the contraction element 15. The contraction element 51 is anchored with its other end 58, illustrated on the right in FIG. 16, in a spring plate 60 via a sleeve 59. The spring plate 60 can be adjusted in the axial direction along the sleeve 59 via a thread 61. The spring accumulator 29 contains, moreover, a helical compression spring 62 which is arranged co-axially to the contraction element 51 and which is supported, in the axial direction, on the one hand, on the base 55 and, on the other hand, on the spring plate 60. Furthermore, a housing 63 is provided, which can be screwed by means of a thread 64 onto the base 55 and which protectively encases the moveable components of the spring accumulator 29.

In contrast to conventional spring accumulators, the spring accumulator 29 according to the invention, shown here, has no compressible gas volume; the spring action is achieved via the helical compression spring 62. When the hydraulic medium is pressed into the pressure chamber 53 of the contraction element 51 via the hydraulic connection 56, the pressure in the pressure chamber 53 rises, with the result that the casing 52 is widened radially outwards and at the same time shortened axially. This axial length shortening is counteracted by the helical compression spring 62 which in this case is compressed.

With an increasing volume in the pressure chamber 53, the tensile force capable of being transmitted by the casing 52 decreases, together with the shortening, so that the counter force of the helical compression spring 62 also does not rise linearly. Accordingly, the spring accumulator 29 shown here possesses a digressive force/volume characteristic curve or force/travel characteristic curve.

The spring accumulator 29 may be pre-stressed by the spring plate 60 being positioned axially along the sleeve 59. Moreover, it is particularly advantageous, in this spring accumulator 29, that no frictional losses occur, apart from fluidic friction, since, in particular, the spring plate 60 does not have to be guided on the housing 63.

For a particular embodiment, the housing 63 may be designed as a pressure housing, in which case the connection (thread 64) at the base 55 is made pressure-tight correspondingly. By actions affecting the inner space 65 (pressurizing the inner space 65) of the housing 63, in which the moveable elements, to be precise the helical compression spring 62 and the contraction element 51, of the spring accumulator 29 are accommodated, higher pressures can be adopted, overall, that is to say the spring accumulator 29 can be operated at a correspondingly increased pressure level.

As already mentioned earlier, the spring accumulator 29 according to the invention operates free of gas. Accordingly, the characteristic curve or the operation of the spring accumulator 29 is relatively independent of the temperature of the hydraulic fluid. Whereas, in a conventional spring accumulator operating with a gas volume, the pressure in the gas volume is highly temperature-dependent, the volume of the hydraulic medium changes comparatively little because of temperature fluctuations, so that the spring accumulator 29 according to the invention is virtually temperature-independent in terms of its operation. The spring characteristic curve of the spring accumulator 29 is determined essentially by the choice of the helical compression spring used and by the pre-stress of the latter.

When a spring accumulator 29 of this type is combined with an active or passive hydraulic support structure, in particular according to FIGS. 1 to 8 and 11 to 15, a spring system is obtained which operates without a gas volume and therefore has no or only a comparatively low temperature dependence. A suspension system of this type consequently operates virtually identically in all temperature ranges, with the result that vehicle safety is increased.

What is claimed is:

1. A suspension of a vehicle wheel on a vehicle body, with a spring strut device for the accommodation of compressive forces acting between the vehicle wheel and the vehicle body and connected as a linear actuator between said vehicle wheel and said vehicle body for adjusting the distance between the vehicle wheel and the vehicle body, said spring strut device comprising at least one tubular contraction element including at least one pressure chamber in a casing, said casing being designed in such a way that a pressure increase in said pressure chamber widens the casing radially and shortens it axially, and a force deflection device, which converts the compressive forces occurring between the vehicle wheel and vehicle body into tensile forces, said force deflection device including two support elements designed to be displaceable one within the other in a spring-compression direction of the vehicle wheel with respect to the vehicle body, one support element having a first end connected to the vehicle wheel and the other support element having a first end connected to the vehicle body, and said at least one contraction element being arranged concentrically with the support elements and engaging, at its one end, a second end of one support element and, at its other end, a second end of the other support element so as to subject said contraction element to tensile forces for accommodating said compressive forces.

2. A suspension according to claim 1, wherein on of the two support elements is provided with a coil-shaped compression spring, via which the ends of this support element are connected on one another.

3. A suspension according to claim 1, wherein said at least one contraction element is annular and has concentric outer and inner casings with said pressure chamber being formed radially between the two casings, said casings being designed in such a way that a pressure rise in the pressure chamber shortens both casings axially by extending the outer casing radially outwards and the inner casing radially inwards.

4. A suspension according to claim 3, wherein said at least one contraction element includes centrally an axial passage which is surrounded by the inner casing and a damper unit is disposed in said axial passage and is connected at one end, to the vehicle wheel and, at another end, to the vehicle body.

5. A suspension according to claim 3, wherein said at least one contraction element contains centrally an axial passage which is surrounded by said inner casing, said axial passage and said pressure chamber of said at least one contraction element communicating with one another.

6. A suspension according to claim 5, wherein a flow-damping member is arranged between the pressure chamber of the annular contraction element and. the axial passage.

7. A suspension according to claim 5, wherein a further contraction element is arranged co-axially in said axial passage, said further contraction element including a pressure chamber which is filled with a gas, said axial passage and said pressure chamber of said annular contraction element being filled with hydraulic fluid.

8. A suspension according to claim 5, wherein at least one of said pressure chamber of said annular contraction element and said axial passage contains a gas volume.

9. A suspension according to claim 1, wherein at least one inner contraction element is arranged in said pressure chamber of said at least one contraction element and the at least one inner contraction element includes a pressure chamber filled with hydraulic fluid, whilst the pressure chamber of the outer contraction element is filled with at least one of a gas and a hydraulic fluid.

10. A suspension according to claim 1, wherein a plurality of contraction elements are provided which are arranged so as to act in series or in parallel.

11. A suspension according to claim 1, wherein said two support elements are formed by cages which are axially displaceable one in the other.

12. A suspension according to claim 1, wherein the pressure chamber of said contraction element is connected via a fluid line to a pressure source.

13. A suspension according to claim 12, wherein said pressure source is a spring-biased accumulator connected to said fluid line.

14. A suspension according to claim 13, wherein said spring-biased accumulator comprises at least one further contraction element including a pressure chamber, said further contraction element being supported at one end, on a base and, at another end, on a spring plate and a helical compression spring is arranged axially around said further contraction element and supported, at one end, on said base and, at the other end, on said spring plate.

15. A spring accumulator for a hydropneumatic spring element, including at least one tubular contraction element which has at least one fluid pressure chamber formed in a casing, said casing being designed such that a pressure rise in the fluid pressure chamber widens the casing radially and shortens it axially, said pressure chamber of said contraction element being connected to a pressurized fluid system, the contraction element being connected at one end to a base and, at an opposite end, to a spring plate, and a helical compression spring being arranged co-axially to the contraction element and supported, at one end, on said base and, at the other end, on said spring plate.

* * * * *